United States Patent [19]
Cleveland et al.

[11] Patent Number: 5,566,032
[45] Date of Patent: Oct. 15, 1996

[54] METHOD FOR UTILIZING A LONGITUDINAL TRACK ON A HELICAL SCAN TAPE DATA STORAGE SYSTEM TO PROVIDE A FAST SEARCH CAPABILITY

[75] Inventors: Brian G. Cleveland, Boulder; William C. Dodt, Broomfield; Douglas C. Hansen, Boulder, all of Colo.

[73] Assignee: Storage Technology Corporation, Louisville, Colo.

[21] Appl. No.: 504,540

[22] Filed: Jul. 20, 1995

Related U.S. Application Data

[63] Continuation of Ser. No. 182,680, Jan. 14, 1994, abandoned, which is a continuation of Ser. No. 791,486, Nov. 12, 1991, abandoned.

[51] Int. Cl.$^6$ .................................................. G11B 15/18
[52] U.S. Cl. ............................................................ 360/72.2
[58] Field of Search .............................. 360/72.2, 78.07, 360/14.2, 72.1, 72.3

[56] References Cited

U.S. PATENT DOCUMENTS

| | | | |
|---|---|---|---|
| 3,789,138 | 1/1974 | Terada | 360/10.3 X |
| 4,591,931 | 5/1986 | Baumeister | 360/14.3 X |
| 4,692,819 | 9/1987 | Steele | 360/72.2 X |
| 4,723,181 | 2/1988 | Hickok | 360/72.2 |
| 4,890,171 | 12/1989 | Nagao | 360/72.2 X |
| 4,937,689 | 6/1990 | Seaver et al. | 360/78.07 |
| 4,970,612 | 11/1990 | Renders et al. | 360/74.3 X |
| 5,079,651 | 1/1992 | Tsuchida et al. | 360/72.2 |
| 5,144,500 | 9/1992 | Odaka et al. | 360/32 |
| 5,155,811 | 10/1992 | Dean et al. | 360/72.2 X |
| 5,179,479 | 1/1993 | Ahn | 360/72.1 |

OTHER PUBLICATIONS

"DC Motors Speed Controls Servo Systems" by Robbins & Mers/Electro–Craft, 1988, pp. 5–66.

*Primary Examiner*—Aristotelis Psitos
*Assistant Examiner*—James T. Wilson
*Attorney, Agent, or Firm*—Duft, Graziano & Forest, P.C.

[57] ABSTRACT

A novel method is disclosed for performing a high speed search for a selected data block or data file utilizing any one of several presently existing helical scan tape formats which utilize, in addition to the helically scanned tracks, one or more longitudinal tracks for recording indexing information indicative of the location of data blocks and file marks stored on the associated helical tracks. Data file location information is written to a header area on a series of helical tracks and to one (or more) of the longitudinal tracks when a data block or a file mark is written to a tape. A high speed search for a desired data block or data file can then be performed using this track location information.

4 Claims, 11 Drawing Sheets

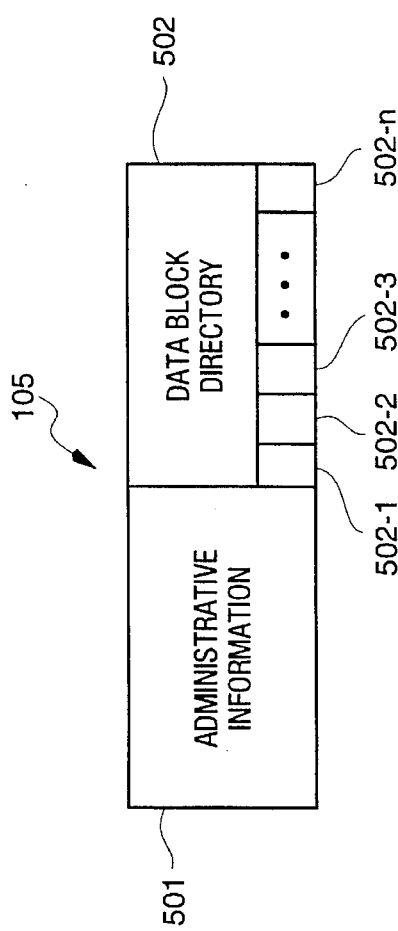

METHOD FOR UTILIZING A LONGITUDINAL TRACK ON A HELICAL SCAN TAPE DATA STORAGE SYSTEM TO PROVIDE A FAST SEARCH CAPABILITY

This application is a continuation-in-part, of application Ser. No. 08/182,680, filed Jan. 14, 1994, now abandoned which is a continuation of application Ser. No. 07/791,486, filed Nov. 12, 1991, now abandoned.

BACKGROUND OF THE INVENTION

This invention relates to helical scan magnetic tape data storage systems, and more particularly, to a method for utilizing longitudinal tracks on a helical scan tape drive to implement a fast search capability for both data blocks and data files.

PROBLEM

Helical scan tape drives store data on short tracks that run diagonally across the tape. Reading data previously recorded on these diagonal (helical) tracks is a relatively slow process as compared to reading data recorded on the longitudinal tracks used by conventional longitudinal tape drives. This relative slowness is a result of the tape being moved at a relatively slow longitudinal speed in order to allow a rotating head to follow and read the helical tracks. The rotating head cannot reliably read data stored on the helical tracks when the read operation is performed at high longitudinal tape speeds.

It is desirable that a tape drive be able to locate a given data record or block on a helical track in a short period of time. This process is called a high speed search. The primary goal of a high speed search is to minimize the search time while locating the desired data record/block on the tape. During a high speed search, the tape is accelerated to a high longitudinal speed in order to minimize the search time. A resulting problem is that data record/block identification information written on the helical tracks cannot be read reliably while the tape is moving at a high longitudinal speed.

One tape format used presently by helical scan recorders is known as NTSC "D3". The D3 tape format was developed for use by the video broadcast industry as a format for video tape. Video tape, as used by that industry, is not typically arranged into "data files". Therefore, the concept of a high speed search to the beginning of a data file does not exist with respect to the D3 format. The video broadcast industry typically performs high speed searches to "time locations" within the tape (one hour from the beginning of a tape, for example). In order to do this, the D3 tape format includes time information written on a longitudinal track. However, this time information is not sufficient to allow an efficient high speed search for data files stored on the tape. Data recording also requires other information to be recorded, such as data block (record) identifiers, as well as file marks which delineate each data file stored on the tape.

SOLUTION

The present invention employs a novel method to perform a high speed search for a selected data block or data file utilizing any one of several presently existing helical scan tape formats. The present method is operative with any of these presently existing tape formats which utilize, in addition to the helically scanned tracks, one or more longitudinal tracks for recording indexing information indicative of the location of data blocks and file marks stored on the associated helical tracks. These longitudinal tracks can be read at higher longitudinal tape speeds than the corresponding helical tracks, thus providing faster locating of desired data blocks and data files than a search conducted using only the helical tracks. The method of the present invention writes data file location information to a header area on a series of helical tracks and to one (or more) of the longitudinal tracks when a data block or a file mark is written to a tape. A high speed search for a desired data block or data file can then be performed using this track location information.

One of the longitudinal tracks contains servo information which is used by the tape drive in conjunction with the information stored in the header area on the helical tracks to locate a desired data block, at fast longitudinal speeds. Another of the longitudinal tracks contains file marks which are used to separate the data files written on the magnetic tape from one another. By using the information stored in the header area of the helical tracks in conjunction with the data position information stored on the longitudinal tracks, the velocity profile of the tape drive servo can be optimized to allow a particular area of the tape containing a desired data record or file to be quickly located.

BRIEF DESCRIPTION OF THE DRAWING

FIG. 5 illustrates the two main sections contained in the header segment of the magnetic tape;

FIG. 6 illustrates the elements contained in the directory section of the header segment of the magnetic tape;

DETAILED DESCRIPTION OF THE INVENTION

Figure 1:
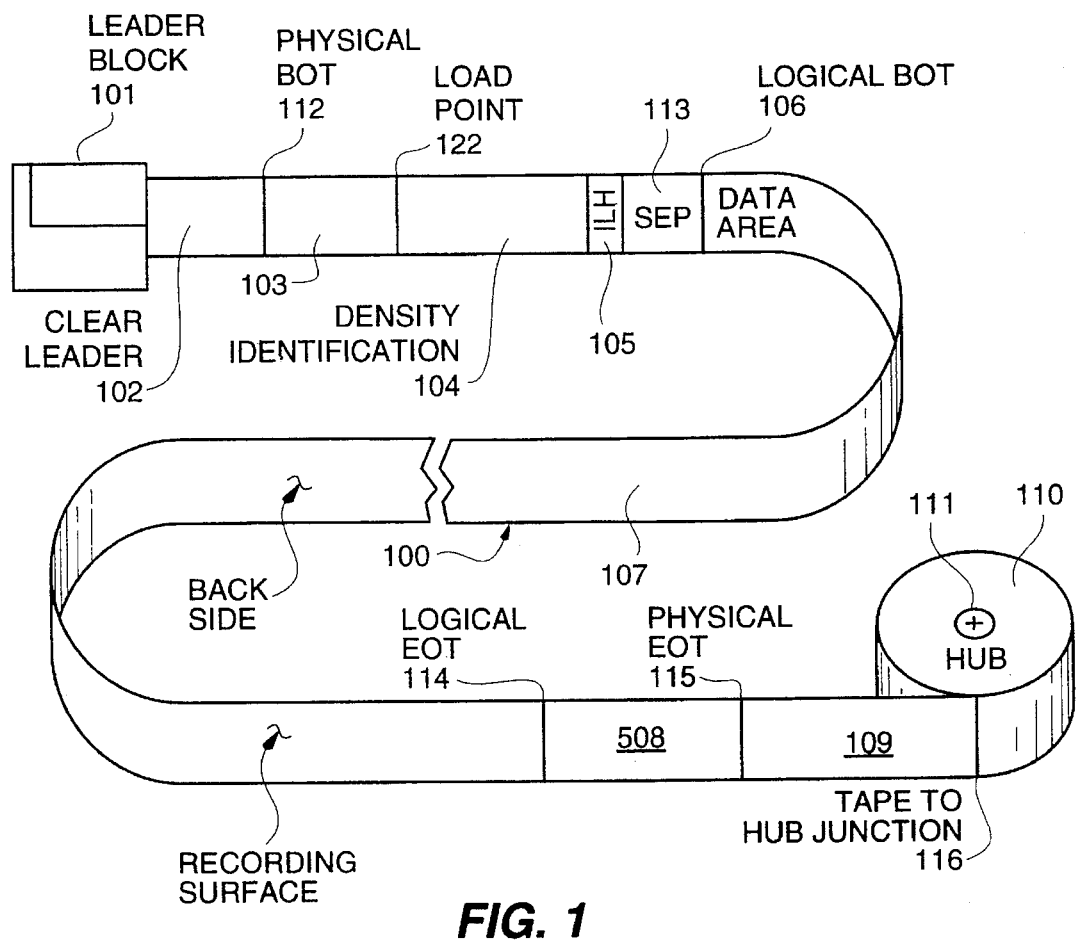
FIG. 1 illustrates the physical format of the magnetic tape media.
Figure 2:
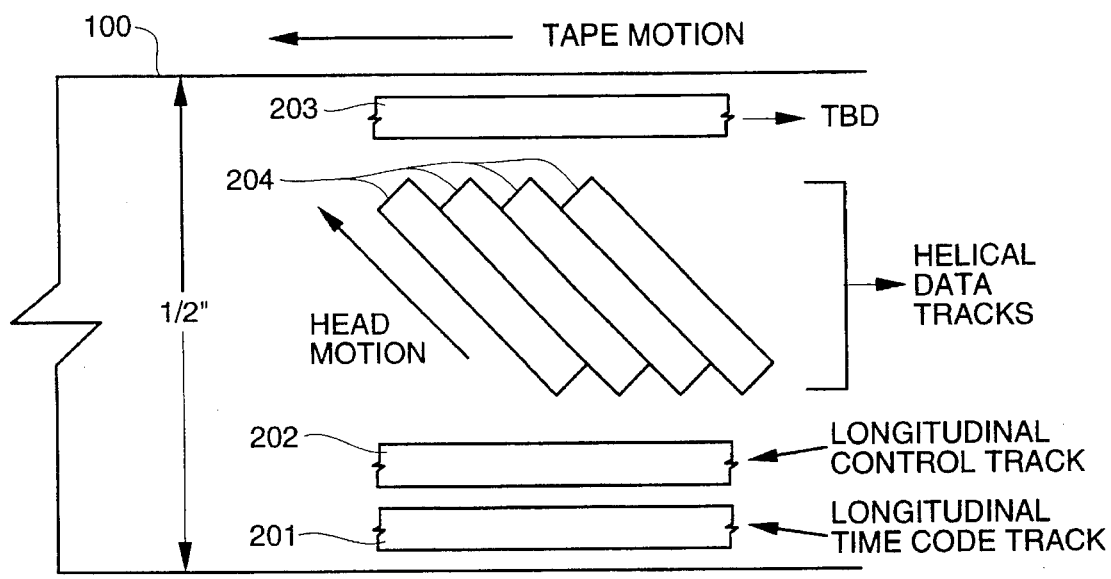
FIG. 2 illustrates the data recording format of helical scan magnetic tape.

FIG. 1 illustrates the physical format of the magnetic tape media employed by the method of the present invention, and FIG. 2 illustrates the data recording format of helical scan magnetic tape. The "data" typically stored on a helical scan tape recorder consists of video images, which are generally displayed on a video monitor. The video broadcast industry has promulgated several standards for recording video data, including "D2" and "D3" formats. The D2 and D3 formats are defined by ANSI V98.12-1985 and EBU Tech 3097E standards, respectively. In both of these formats, the video data is written sequentially to tracks 204 that run diagonally across the tape 100, i.e., "helical" tracks 204. In addition, each of these formats includes a longitudinal track 201 containing time code information. This time code information has conventionally been used in the video industry to locate video data based on relative differences in time between two given tape positions. In contrast to the conventional use of this time code information to locate video images, the method of the present invention uses this time code information to locate data written on the magnetic tape 100.

In order to coordinate the data stored on the helical tracks 204 with the data stored on longitudinal tracks 201, 202, the method of the present invention utilizes tape location information stored in the internal leader header 105, (also termed "ILH", and shown in FIG. 6), described below. The information stored in this header 105 provides a novel and unique means of locating a given data block 401 via corresponding servo data stored on longitudinal servo control track 202, and on longitudinal time code track 201. Servo pulse doublets that mark the location of each helical track preamble 712 are recorded on the longitudinal servo control track 202. Using this servo pulse information in conjunction with scan group position location information stored in the internal leader header 105, the tape transport 300 can position the magnetic tape 100 at a speed of 100 times the normal recording speed (100×) to a scan group 700 containing a desired data block 401. In addition, the time code information recorded on longitudinal track 201 can be utilized to perform a search at 60 times the normal recording speed (60×) to locate tape/file marks 403 which are used to delineate data files written to the magnetic tape 100.

Physical Format of Helical Scan Magnetic Tape

FIG. 1 illustrates the physical format of the helical scan magnetic tape 100, including the header segment 105 thereof. The magnetic tape 100 includes a leader block 101 that is attached at one end thereto and a single reel 110 around which the magnetic tape 100 is wound into cartridge 301 (shown in FIG. 3). A length of clear leader 102 is optionally interposed between the physical beginning (physical "BOT") 112 of the magnetic tape 100 and the leader block 101 in order to protect the magnetic tape 100 when it is wound in the magnetic tape cartridge 301 around the reel 110. A length 103 (typically 3m) of tape 100 exists between the physical beginning of tape and a location known as the "load point" at which point the density identification segment 104 of the magnetic tape 100 begins. The density identification segment 104 consists of 209 scan groups 700 (described below) written on the magnetic tape 100. The density identification segment 104 represents data accessible by the tape drive that is indicative of the physical characteristics of the magnetic tape 100. At the end of the density identification segment 104 of the magnetic tape 100 is the internal leader header segment 105 which is described below. The internal leader header 105 consists of a single scan group 700 and is followed by the separator segment 106 of the magnetic tape 100 which consists of 300 scan groups 700 or 16.53 linear inches of magnetic tape 100. The separator segment 106 isolates the logical beginning of tape (logical "BOT") 113, which is the start of the data area 107 of the magnetic tape 100, from the prepended header information described above. The data area 107 of the magnetic tape 100 constitutes the majority of the tape 100 and ends at the logical end of tape (logical "EOT") 115 which is a distance from the tape to hub junction 116 wherein the magnetic tape 100 is affixed to the single reel 110 of the magnetic tape cartridge 301. A length of trailer tape 109 is interposed between the physical end (physical "EOT") 115 of the magnetic tape 100 and the tape to hub junction 116.

FIG. 2 shows the physical relationship between the helical tracks 204 and the longitudinal tracks 201, 202, 203 on a typical D3 format helical scan magnetic tape 100 as used by the method of the present invention. There a number of commercially available helical scan recorders which employ a D3 format.

The time code track 201 in each of the aforementioned tape formats contains tape location information that uniquely identifies each "scan group" 700 on the tape. A scan group 700 is the basic unit for formatting data written to the magnetic tape 100, and is described below.

The longitudinal time code track 201 is recorded each time a new helical track 204 is recorded. The time code track 201 contains information for locating a given scan group 700 on the magnetic tape 100. Although similar location information is also recorded on the helical tracks 204, the longitudinal time code track 201 can be read at higher tape speeds, due to the fact that it is longitudinally recorded. Therefore, the longitudinal time code track 201 is best-suited for conducting high speed searches for file marks 403 recorded on the helical tracks 204. Note that utilization of the servo doublet pulses recorded on the longitudinal servo control track 202 provides the fastest means of positioning the magnetic tape 100 to a given scan group 700.

Tape Drive System Architecture

Figure 3:
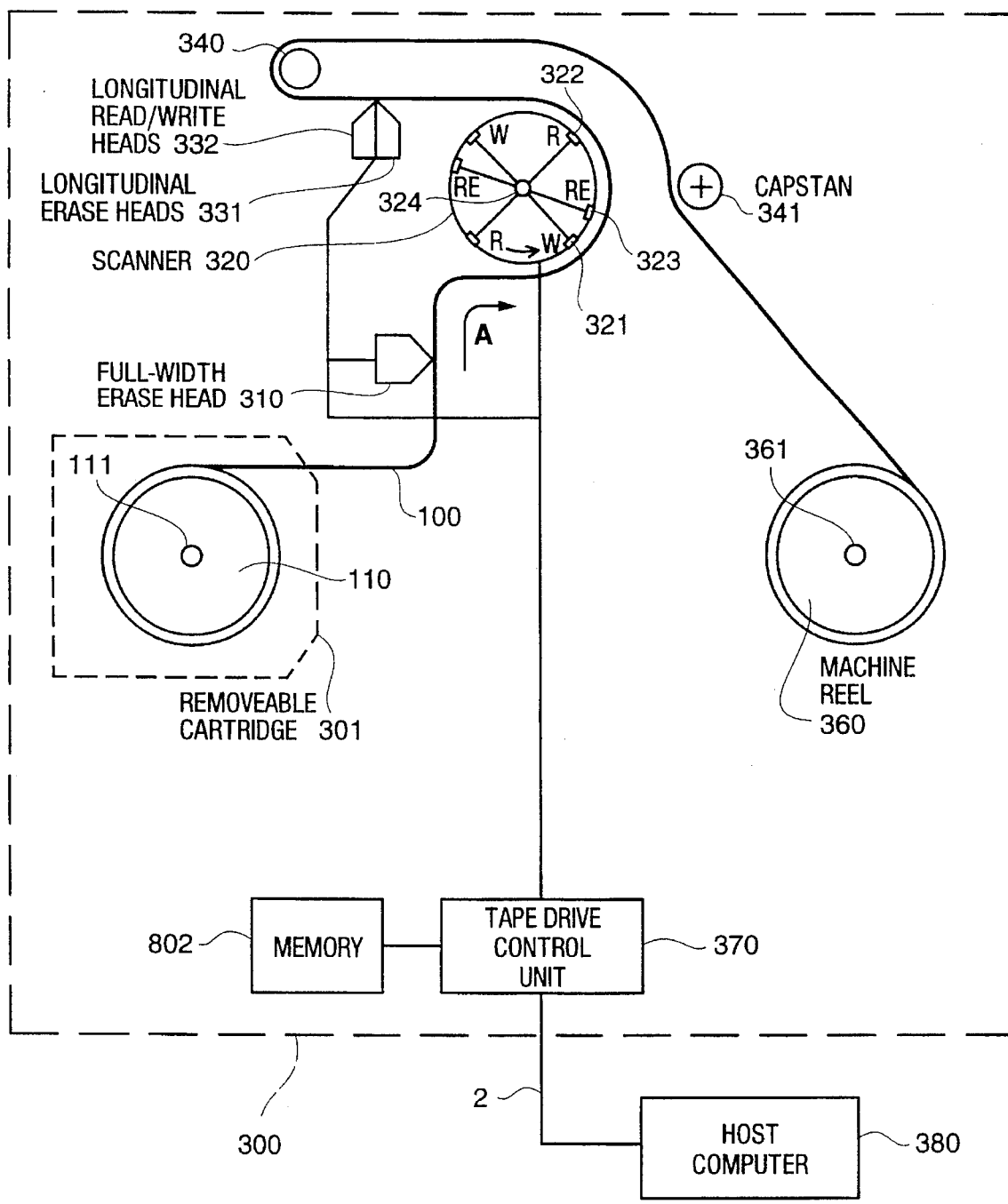
FIG. 3 illustrates in block diagram form the overall architecture of a typical tape drive control unit.

The apparatus illustrated in FIG. 3 represents the well known tape transport elements found in helical scan tape drives that are used to read and write data on magnetic tape 100. In a helical scan tape drive, the magnetic tape 100 from the cartridge 301 is threaded past a fixed full width erase head 310, the scanner 320 which contains two pairs of helical read heads 322 and two pairs of helical write heads 321 and one pair of erase heads 323, a fixed longitudinal erase head 331 and a fixed longitudinal read/write head 332. The full width erase head 310 erases the entire width of the magnetic tape 100 and it is used when data is recorded on virgin tape. It is also used when data is recorded on a previously used magnetic tape, if none of the data previously recorded magnetic tape 100 is to be preserved on the and the entire magnetic tape 100 is overwritten with new data.

Host computer 380 transmits a stream of data records to control unit 350 in tape drive 300, where the data records are formatted for writing in helical scan form on magnetic tape 100 via scanner 320. The tape wrap angle is slightly less than 180° so that a pair of read heads 322, a pair of write heads 321 and one erase head 323 are constantly in contact with the magnetic tape 100 in order to continuously read and write data thereon. The helical write head pairs 321 simultaneously record two tracks of data at a time on the magnetic tape 100 with an azimuth angle between adjacent tracks being plus and minus 20°. Similarly, the helical read head pairs 322 simultaneously play back two tracks of data at a time from magnetic tape 100. There are also three fixed longitudinal erase 331 and read/write heads 332 to read and write data on the corresponding three longitudinal tracks contained on the magnetic tape 100: control, time code and one to be determined. These three longitudinal read/write heads 332 can be used individually or in any combination when editing new information into pre-recorded data. Tape drive control unit 370 includes or has control over a memory 802 for buffering data and/or otherwise storing tape administration information such as internal leader header 105, in a manner well known and practiced in the tape storage system art.

Write Data Path

Figure 8:
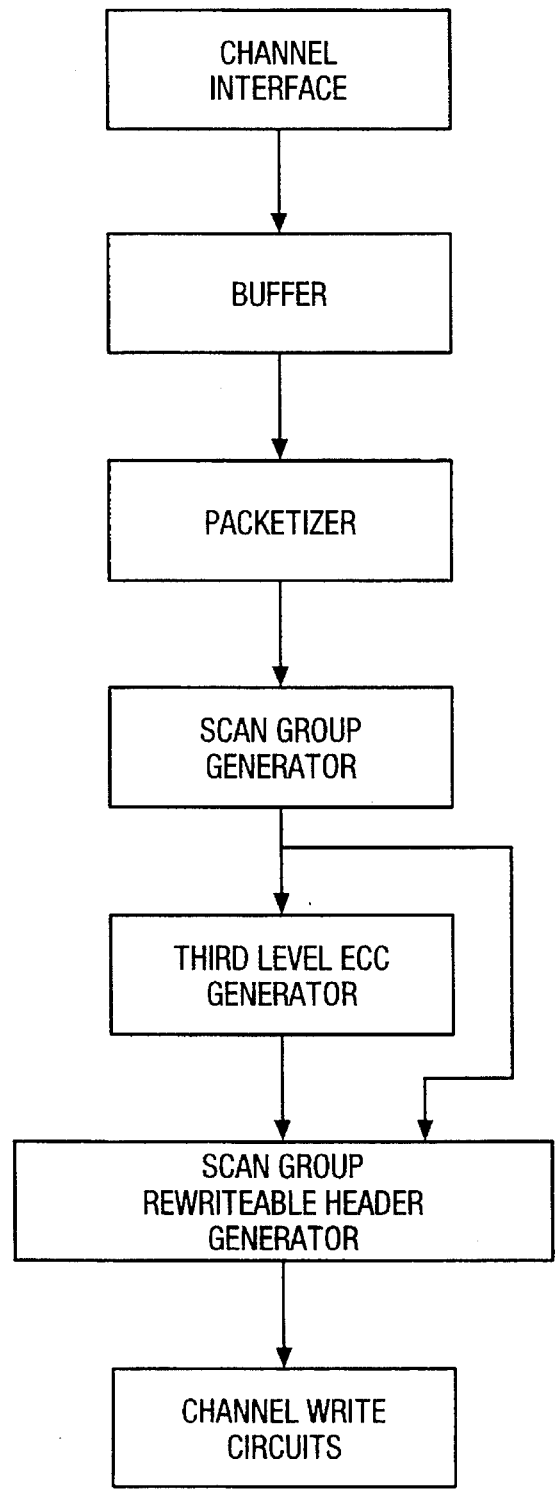
FIG. 8 illustrates in block diagram form the architecture of the write data path in the tape drive control unit.

FIG. 8 illustrates in block diagram form the architecture of the write data path contained within the tape drive control unit 370.

The write data path includes a channel interface circuit 801 which interconnects the tape drive control unit 370 with the data channel from the host processor. Channel interface circuit 801 receives data blocks 401 from the host computer 380 and stores them in buffer 802 for processing by the tape drive control unit 370. Buffer 802 stores a predetermined amount of data that is received from the host computer 380. A typical buffer size is 16 Mb in order that the host computer 380 can write a significant amount of data into the tape drive control unit 370 without requiring interruption of the data transfer caused by the movement or delay in movement of the magnetic tape 100 on the tape drive.

Packetizer circuit 803 retrieves the data from buffer 802 and packetizes the data by adding a packet header which is protected by a cyclic redundancy check (CRC). Data records received from the host computer 380 whose block size do not exceed 262K bytes are followed by a packet trailer and a CRC which protects the data and the packet trailer. The packets produced by packetizer 803 are transmitted to scan group generator 804 which reformats the packetized data in the scan groups. If a scan group is incompletely filled with data, pad bytes are added to the scan group as required to complete the scan group. A correctable scan group header and a two byte CRC character is then prepended to the scan group. The scan group thus generated transmits to third level ECC generator 805 which exclusive ORs twenty-four scan groups to produce a third level ECC scan group. In addition, the scan groups are transmitted to rewriteable scan group header generator 806 which produces a rewriteable scan group header and CRC code which protects this rewriteable scan group header, both of which are prepended to the scan groups. The resultant data is then transmitted to the channel write circuits 807 for writing the data onto the helical scan magnetic tape 100.

Data Format of the Helical Scan Magnetic Tape

Figure 4:
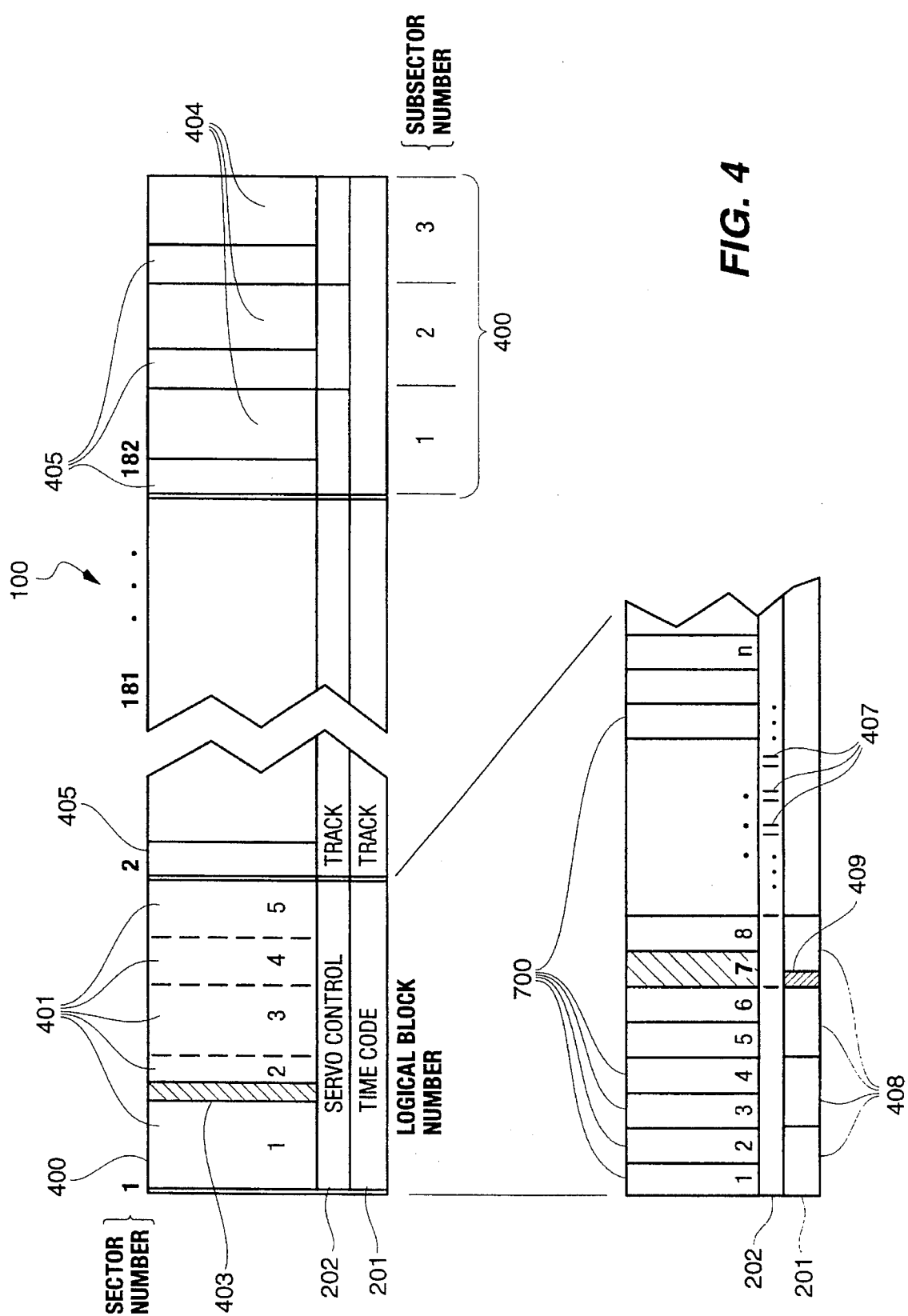
FIG. 4 illustrates the positioning information recorded on the magnetic tape.
Figure 7:
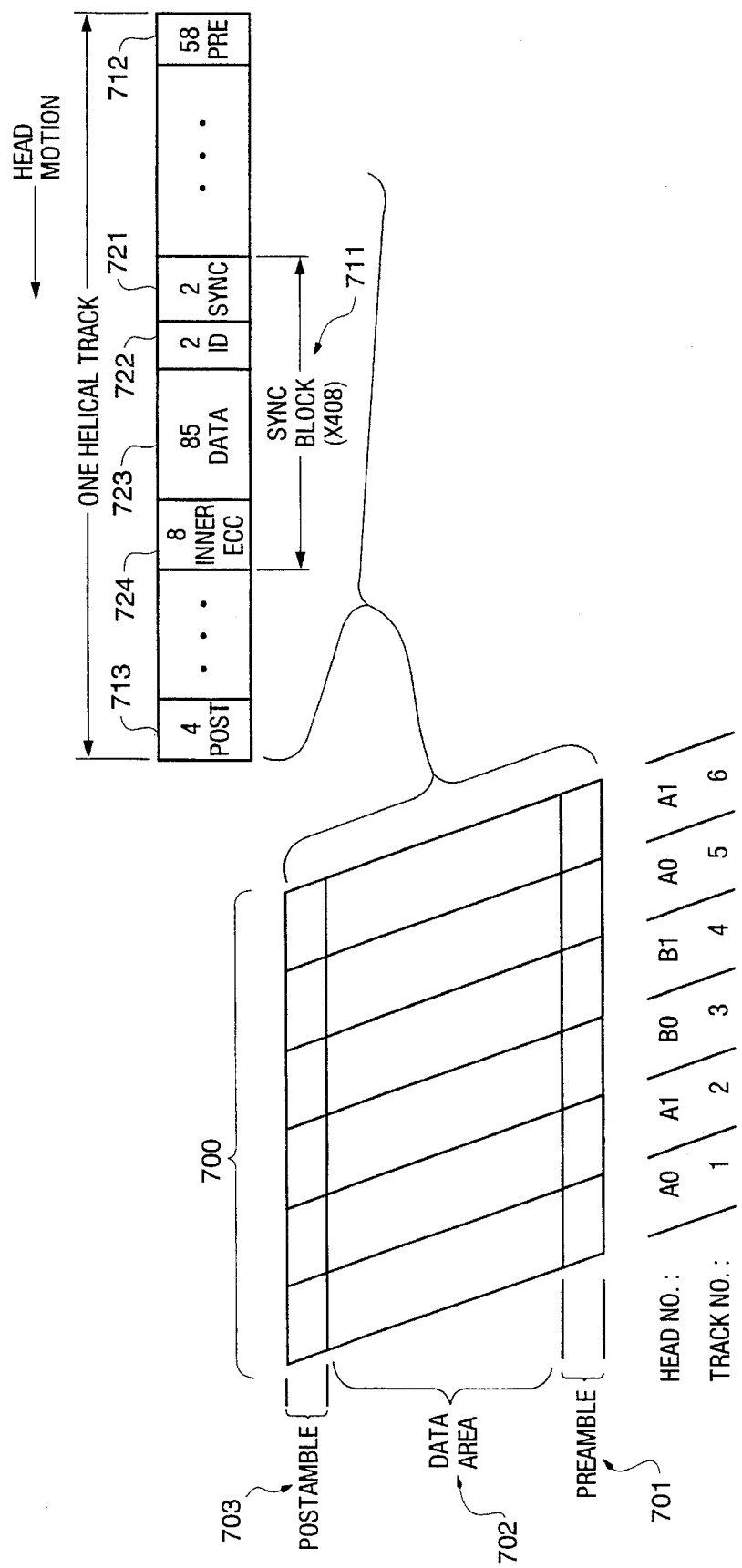
FIG. 7 illustrates the data recording format of helical scan magnetic tape.

FIGS. 2 and 7 illustrate the data recording format of the helical scan magnetic tape 100 used herein, and FIG. 4 illustrates the positioning information recorded on the magnetic tape 100. The magnetic tape 100 is divided into 182 sectors 400, each of which is subdivided into three subsectors 404. Each sector/subsector 400/404 is also subdivided into a plurality of physical scan groups 700. Each sector 400 potentially contains a variable number of logical data blocks 401, due to the fact that the data blocks 401 are of variable length. FIG. 4 also shows a file mark (also known as a "tape mark") 403, which is a special type of scan group.

Although the data block 401 is the basic unit used by the host computer 380 to transfer data to the tape drive controller, the scan group 700 is the basic unit for formatting data on the magnetic tape 100. As two adjacent write heads 321 of the scanner 320 move across the magnetic tape 100, two helical tracks 204 of data are simultaneously written on to the magnetic tape 100. Once the scanner 320 has completed one half of a revolution, the other pair of write heads 321 begins to write the next two adjacent tracks 204 on to the magnetic tape 100. One and a half revolutions of the scanner 320 produce the six tracks (1–6) illustrated in FIG. 7 to complete a single scan group 700. This can be seen from FIG. 7, where a postamble 703 and preamble 701 are written on either end of the data area 702 of each track 204 written on to the magnetic tape 100 in order to enable the read heads 322 to accurately read the data contained thereon.

In addition, the data format of a single helical track is illustrated in FIG. 7 to note that the preamble 712 consists typically of fifty-eight bytes of data and the postamble 713 includes four bytes of data. Interposed between the preamble 712 and the postamble 713 are 408 sync blocks 711 which contain eighty-five bytes of user data 723 each. In addition, two synchronization bytes 721 are prepended to the data 723 along with two identification bytes 722. Eight bytes of inner error correcting code 724 is appended to the end of the data 723 in order to complete the format of the sync block 711. The inner ECC code 724 illustrated in FIG. 7 covers both data 723 and identification 722, but not synchronization bytes 721 contained in the sync block 711. Therefore, a (93,85) Reed Solomon code is formed to detect errors contained in the data 723 and identification (block ID) 722 fields of the sync block 711. The sync pattern 721 portion of the sync block 711 is a fixed pattern of data bits used to resynchronize the read clock and logic after dropouts. Of the 408 sync blocks 711 in a single track 204, twenty-four are used at the start of the track 204 for outer ECC check bytes. Therefore, the are (408−24)×85=32,640 bytes per track 24 of user data 723. With six tracks 204 per scan group 700, a scan group 700 contains 97,920 bytes of user data 723.

FIG. 4 illustrates the positioning information recorded on the magnetic tape 100. The basic unit used to transfer data from the host computer 380 to the magnetic tape 100 is the data block 401, which is analogous to a conventional data record. Each data block 401 sent by the host computer 380 to be written to the magnetic tape 100 is sequentially assigned a unique block number by the tape drive control unit 370. Data blocks 401 are logical entities which may have different lengths, unlike fixed length blocks which are required by some prior art magnetic recording systems. A data block 401 may be larger than a physical scan group, and may also span two adjacent scan groups. Since each physical scan group is the same size, the variable size of the data blocks 401 is transparent to the tape control unit 370 when a high speed data block search is conducted using the longitudinal track servo information in conjunction with the scan group location in the internal leader header 105.

Data block IDs 405 are placed at all sector/subsector 400/404 boundaries in order to provide a mechanism for increasing the speed of a search, and for verifying the location of the contiguously stored data block 401. These data block IDs 405 are referred to as "host block IDs" in the table below, since the data block 401 is the basic unit used by the host computer 380 to write data to the magnetic tape. Subsector 404 boundaries are locateable via the servo control track 202 at a 100× search speed. The fact that a block ID 405 is placed at each subsector 404 boundary allows a search for a specified block to be made which is three times closer in proximity to the specified data block 401 than a search using only whole sector 400 boundaries. Furthermore, the placement of block IDs 405 at subsector 404 boundaries provides a verification of the correctness of a search to a particular subsector 404 wherein a data block 401 having a predetermined (expected) ID number is expected to be found.

The scan group header included in a scan group 700 includes the following information:

| | | |
|---|---|---|
| 1. | Type of scan group | 1 byte |
| 2. | Logical scan group number | 4 bytes |
| 3. | Beginning host block ID (Block ID of byte 0) | 5 bytes |
| 4. | Ending host block ID (Block ID of last byte) | 5 bytes |
| 5. | File ID number | 3 bytes |
| 6. | Number of pad bytes in logical scan group | 3 bytes |
| 7. | Information data byte: File safe bit  Write-without-retry bit | >--> 1 byte |
| 8. | Continuation Information: First host block continued from previous scan group bit  Ending host block continues into next scan group bit | >--> 1 byte |
| 9. | Scan group CRC | 2 bytes |
| 10. | Scan group header CRC (fixed) | 2 bytes |
| 11. | Pointer to first packet that begins in this scan group | 3 bytes |
| 12. | Variable Information: Physical Scan Group Count  Copy Count  Variable CRC | 4 bytes  1 byte  2 bytes |
| 13. | If an ECC group, the number of data groups covered by this ECC. If a data group, the sequence number within this ECC super-group. | 1 byte |
| | SUB TOTAL | 38 |
| | RESERVED | 26 |
| | TOTAL | 64 |

Internal Leader Header

The internal leader header 105 includes two segments: an administrative information segment 501, and the data block directory 502. The information contained in these two segments may include, but is not limited to, the information listed below, as well as in FIG. 6.

Administrative Information

Tape mark locations (specific scan group)
Read Block ID locations
The block IDs at sub-sector boundaries
Last scan group that was written (the end scan group)
Location of last Data Scan group written (if a file safe tape)
Number of volume loads
Flag—third level ECC had to be invoked on read (marginal tape should be replaced)
Number of read/write errors for the last x mounts
Serial number of last y drives upon which this cartridge was mounted
Volume ID
Time and data stamp of mount
Tape type and length
Other pertinent information from Event Log and Buffered Log
Safe File information
Manufacturer's ID and Production Batch Numbers Note that the first four entries in the "administrative" segment ("Tape mark 403 locations", "Read Block ID locations", "Block IDs at sub-sector boundaries", and "Last scan group that was written") are used primarily for optimizing data searches. The internal leader header segment 105 of the magnetic tape 100 is read on every load of the magnetic tape cartridge 301 into a tape drive. The internal leader header 105 is updated by the magnetic tape drive prior to the magnetic tape 100 being physically unloaded therefrom in order to update the header information concerning read and write information contained therein.

Referring to FIG. 5, the data block directory 502 includes a plurality of entries (502-1 to 502-n), one for each data block 401 that is written on to the magnetic tape 100. Each directory entry 502-\*, includes the information illustrated in FIG. 6. A logical block number 601 is a five byte long field that uniquely identifies every block written on to the magnetic tape 100. This sequence number identifies each successive block on the magnetic tape 100 by a logical block number 601 which represents the logical block number of the previously written data block 401 incremented by one. The second element in each entry is the physical sector field 602 of one byte which is the concatenation of the direction bit and segment number used in the locate block command in 3490E-type tape drives. The third element in the entry is the subsector number 603 which is a one byte field that divides each physical sector 400 into three smaller increments thereby allowing the high speed portion of the search to position the tape closer to the requested logical block. The fourth element in the entry is a scan group count 604 of four bytes which represents a unique physical location on the magnetic tape 100. Every scan group 700 written on to the magnetic tape 100 has a unique scan group number assigned to it in order to identify the scan group 700 and differentiate it from all other scan groups 700 written on the magnetic tape 100. The fifth element contained in the entry is a file identification number 605 of three bytes which identifies a numerical file in which the scan group 700 is contained. The file identification 605 is used internally in the tape drive and is transparent to the host computer 380. This file ID number 605 provides a scan group to file correspondence in order to simplify the administering of the data on the magnetic tape 100. The sixth element in the entry is a logical scan group count 606 of four bytes that provides an identification of the logical scan group in which this data block 401 is written. The seventh element in the entry is an identification 607 of the type of entry written on magnetic tape 100. The final element in the entry is a reserved field 608 of four bytes for future use as to be determined.

Longitudinal Tracks

The tape format for helical scan recorded magnetic tape 100 includes three longitudinal tracks 201–203 written on the magnetic tape 100: servo control track 202, time code track 201 and one track 203, the use of which is to be determined. The servo control 202 and time code 201 tracks are located at the bottom of the magnetic tape 100 while the unused track 203 is located at the top of the magnetic tape 100. The servo control track 202 is recorded as the helical tracks are written onto the magnetic tape 100 and contains pulse doublets 407 that mark the location of each helical track preamble written on to the magnetic tape 100. One use of the servo control track 202 is to synchronize, during playback, the rotation of the scanner 320 with the position of the helical tracks 204 on the magnetic tape 100. Another use of the servo control track 202 is to position the magnetic tape 100, at a 100× normal recording speed, to a specified scan group 700 based on scan group location information contained in the internal leader header 105.

The time code track 201 is recorded as new helical tracks 204 are written on to the magnetic tape 100. The time code track 201 contains location information that uniquely identifies each scan group 700 on the magnetic tape 100. Similar location information is contained in the helical tracks 204 themselves, but the longitudinal time code track 201 can be read at a higher tape speed, i.e., at 60× normal recording speed. The longitudinal time code track 201 is primarily used to locate file marks (tape marks) 403 on the magnetic tape 100 during the high speed search activity, although it can also be used as a back-up means of locating data blocks 401. The various high speed search operations of the present invention are used to position a particular physical location on the magnetic tape 100 under the read/write heads 321, 322 of the scanner 320 in a significantly faster time than prior art methods. These methods include positioning the tape to an approximate location of a desired data block 401, or, more inefficiently, searching for the desired data block 401 by performing a continuous read operation until the data block 401 is located.

The servo system in a typical tape drive such as that used by the present method is capable of performing a high speed search to a scan group 700 which can be located via longitudinal track 202 on the magnetic tape 100. The servo can locate a particular "frame" 408 consisting of a group of twelve helical tracks 204 or two scan groups 700. By using the servo control track 202, the tape transport 300 can perform a high speed search at 100× normal recording speed to position magnetic tape 100 within one scan group containing the data block 401 that is requested. This is a much finer resolution than can be obtained by using a simple but less accurate distance measurement employed by prior art physical data identification techniques.

High Speed Search

The method of the present invention has the capability of employing several different techniques to locate a desired data item written to magnetic tape 100. In the method of the present invention, the host computer 380 writes data to the tape 100 in logical data "blocks" 401, which are analogous to conventional data "records."

The fastest search technique used by the present method positions the magnetic tape 100 to the physical scan group 700 within which a requested data block 401 is located. This physical scan group 700 is located by reference to entry 604 ("scan group count") in the data block directory 502. The magnetic tape 100 is positioned at high speed to the desired scan group 700 by counting pulses 407 recorded on the longitudinal servo control track 202.

The locations of first 4000 data blocks 401 on the tape are stored in the internal leader header 105. In addition, at every subsector 404 boundary a block identification number of the adjacent logical data block 401 is also stored on a helical track. This redundant data block location information provides a back-up search capability for situations wherein the integrity of the internal leader header 105 has been compromised, or wherein the internal leader header 105 is non-existent. Furthermore, in the event of magnetic tape 100 having more than 4000 data blocks 401 written thereto, this data block information stored at each subsector 404 boundary enables a given data block 401 to be located significantly faster than by sequentially reading the entire tape 100. Even though a search which uses the subsector 404 boundary data block information is not as fast as a search which uses the internal leader header 105 scan group information, subsector 404 boundary data block searches are considerably (i.e., up to 100 times) faster than prior art searches which require sequential reading of each data block 401 until the desired data block 401 is found.

In addition to writing data blocks 401 to the tape 100, the host computer 380 can also request that the tape drive control unit 370 write file marks (also called tape marks) 403 to the longitudinal time code track 201 on the magnetic tape 100. File marks 403 provide the delineation between data files written on the tape 100. Since the longitudinal track(s) associated with the helically scanned/recorded data can be read at high tape speeds, the method of the present invention uses the longitudinal time code track 201 to store, and subsequently locate, file marks 403. The D2/D3 time code track contains an 80 bit code word 409 for each frame 408. The code word 409 for each frame 408 is unique, thus allowing a search to any given frame on the magnetic tape 100. Therefore, since there are two scan groups 700 per frame 408, a search to within one frame of a given scan group can be made using the longitudinal time code track 201.

Both the D2 and the D3 format time code tracks contain a bit-field group (bits 4-7, 12-15, 20-23, 28-31, 35-39, 44-47, 52-55, 60-63) in each frame 408 for user-defined data. This bit-field group is not accessible by the host computer 380, and prior art recorders have typically ignored this bit-field group. In the present invention, data is placed in certain bits (shown below in table I) in this bit-field group by the tape drive control unit 370 for the purpose of indicating the location of file marks 403 written to the helical data tracks 204.

Note that file marks 403 may occur in consecutive scan groups 700. Since each frame 408 consists of two scan groups 700, the code word 409 must be able to contain two file marks 403. The present method uses four bits in the bit-field group for storing indicators to file marks 703 as shown in Table I, below.

TABLE I

| Status | Bit Positions | | | |
|---|---|---|---|---|
| | 4 | 5 | 62 | 63 |
| File mark in scan group 0 | 1 | X | 0 | X |
| File mark not in scan group 0 | 0 | X | 1 | X |
| File mark in scan group 1 | X | 1 | X | 0 |
| File mark not in scan group 1 | X | 0 | X | 1 |

Two bits (bits 4 and 5) in the bit-field group constitute an indicator for each file mark 403, and two additional bits in the bit-field group are redundant (bits 62 and 63) and used for file mark 403 verification. As shown in Table I, the redundant bit pairs 4/5 and 62/63 are separated as far as possible (within the user-defined area) from each other. This separation significantly reduces the susceptibility of the present method to tape dropouts.

It is to be understood that, in addition to the existing D2 and D3 tape formats, other helical scan tape formats having one or more longitudinal tracks could be used with the method of the present invention to achieve similar results.

Figure 9:
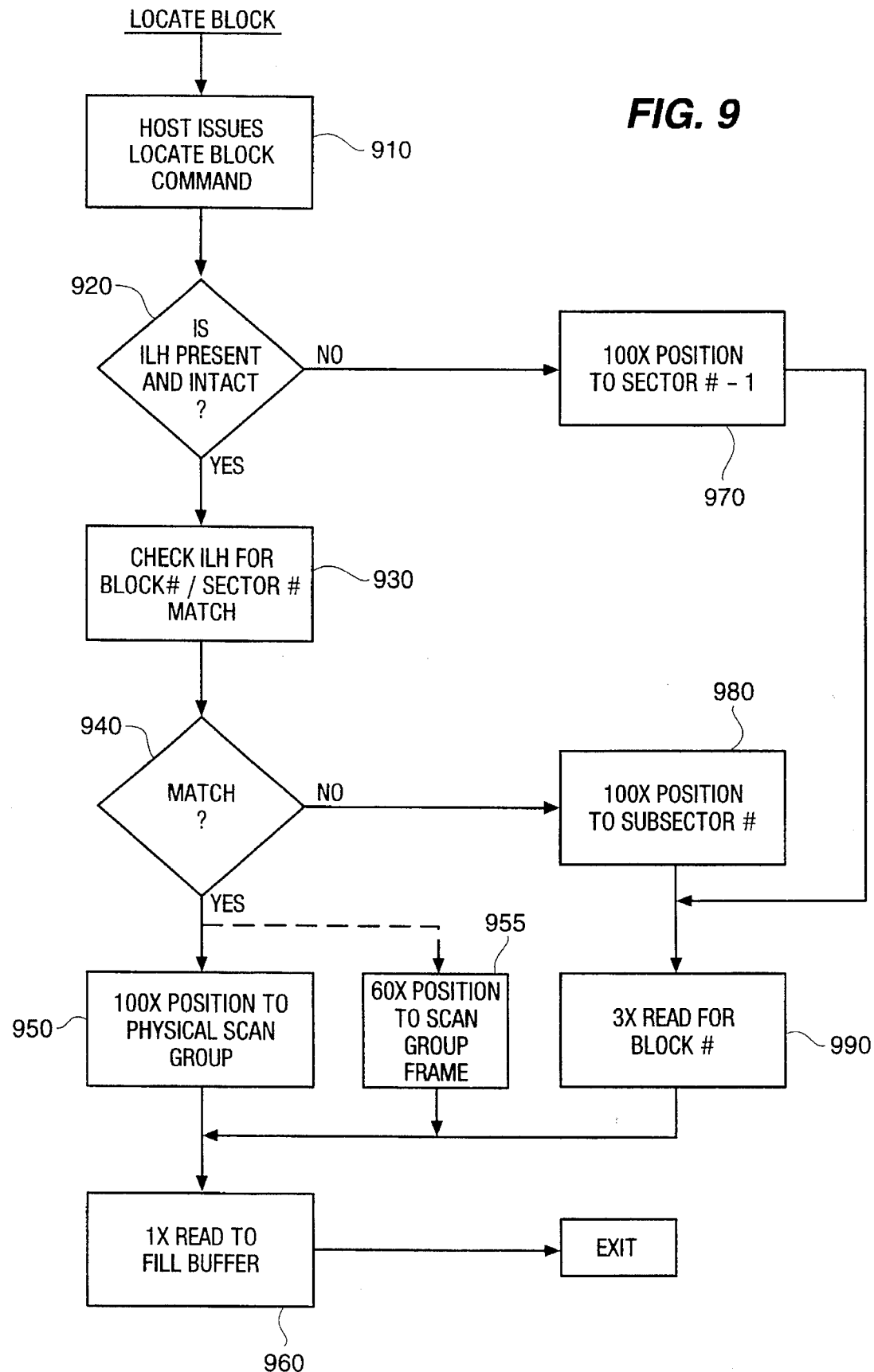
FIG. 9 is a flow chart showing the steps involved in performing a high speed forward space file search.
Figure 10:
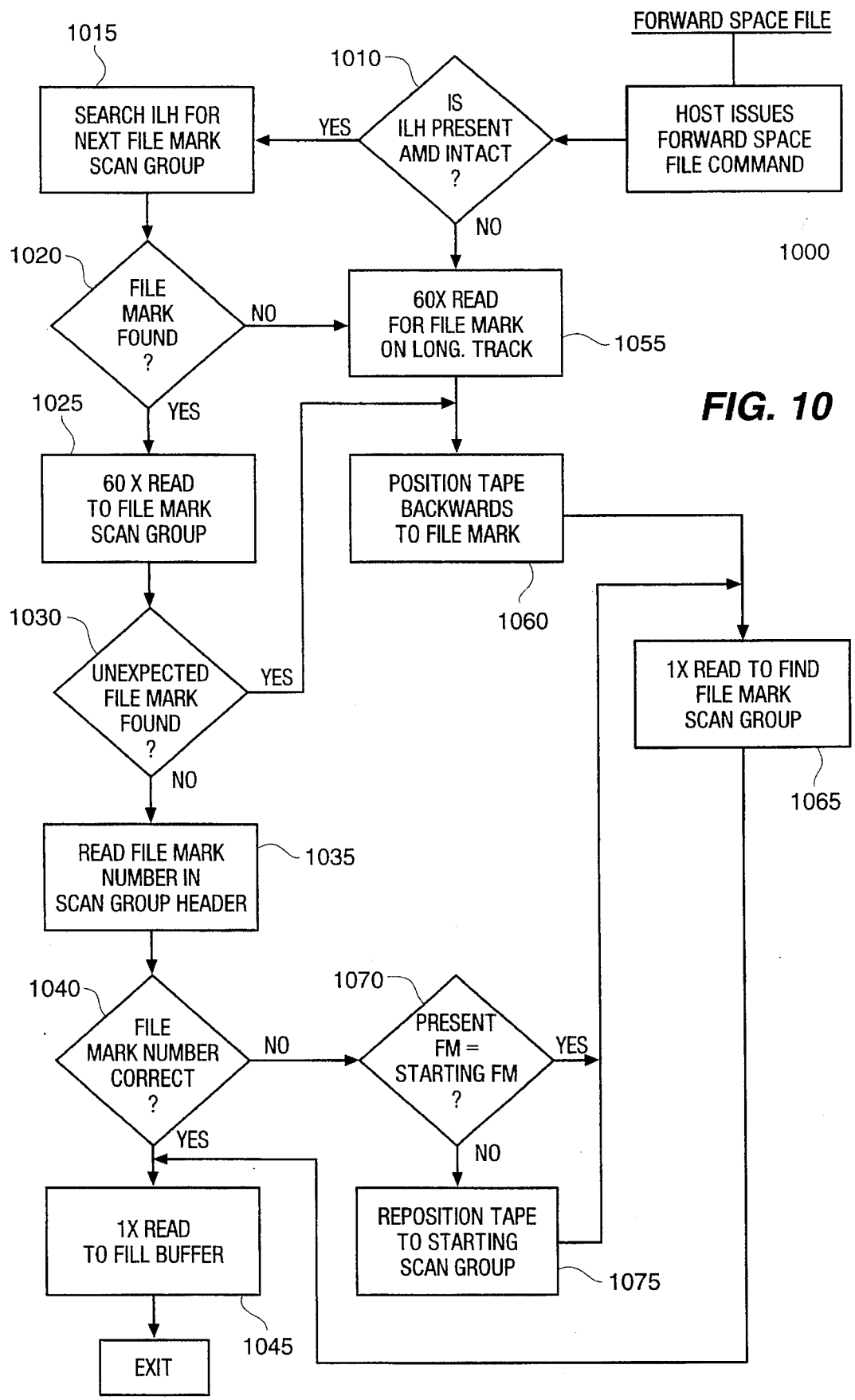
FIG. 10 is a flow chart showing the steps involved in performing a high speed locate data block search.

Two basic types of high speed searches are accomplished by the present method. These are (1) a search to locate a specified data block 401, and (2) a search to locate the next sequential file mark 403 on the tape. FIG. 9 is a flowchart showing the procedure for locating a specified data block 401, given a data block ID 405 and a sector 400 number. FIG. 10 is a flowchart showing the procedure for positioning the tape forward to the next sequential file mark 403. The steps shown in the FIG. 9 and FIG. 10 flowcharts are implemented by logic circuitry in the tape drive control unit 370. Both FIGS. 9 and 10 are best explained in conjunction with the following FIGS. 11–15, which are velocity profiles (not to scale) showing magnetic tape velocity vs. magnetic tape position for a given type of search. In each of the FIGS. 11–15, the vertical axis of the graph represents the longitudinal velocity, V, of the magnetic tape 100 as a function of the position, P, of the magnetic tape 100, which is represented by the horizontal axis of the graph.

Note that the tape drive control unit 370 provides the necessary logic circuitry, well-known in the art, for implementing each of the velocity profiles illustrated in FIGS. 11–15 and described below. In any of the high speed search techniques discussed below, the present invention assumes that a tape has been mounted on tape drive unit 300 and that the internal leader header 105 is stored in memory 802 for subsequent reference pursuant to a search in a manner well known and practiced in the tape storage system art.

Locate Data Block

Figure 11:
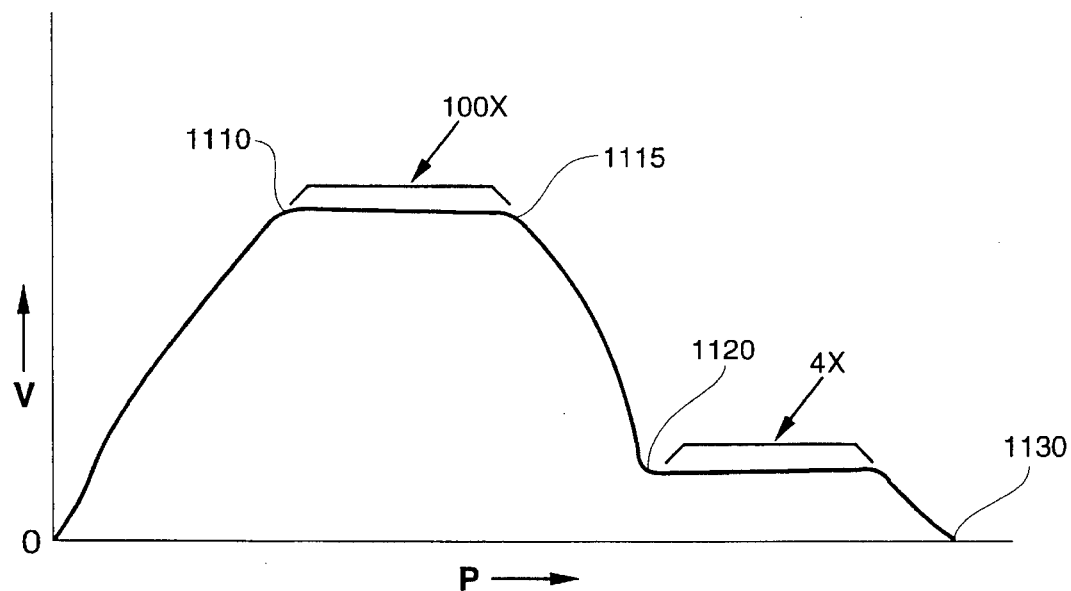
FIG. 11 is a velocity profile illustrating a "locate data block" operation.

FIG. 11 is a velocity profile illustrating a "locate data block" operation. The procedure for locating a desired (target) logical data block 401 on the magnetic tape 100 is described as follows:

At step 910, the host computer 380 issues a "Locate Block" command to the tape drive control unit 370. The Locate Block command includes parameters specifying the requested data block number (block ID 405) and the sector number in which the data block 401 is expected to be found. At step 920, a check is made by the tape drive control unit 370 to determine whether the internal leader header 105 is both present and usable. If the internal leader header 105 is intact, then at step 930, the data block directory 502 in the internal leader header 105 is searched to find the entry containing the requested data block 401. If, at step 940, the entry in the data block directory 502 has the same sector number 602 and block number 601 as the parameters in the Locate Block command, then at step 950, the tape 100 is positioned to the physical scan group 700 within which the requested data block 401 is located, as shown in FIG. 11. This position operation at step 950 is performed at 100× via servo pulse information recorded on the servo control track 202. Alternatively, at step 955, the requested data block is located via a 60× search using block ID 401 information stored on the time code track 201. This alternative locate data block operation is performed in a manner analogous to a Forward Space File operation, described below. Physical scan group 700 is located at step 950 by reference to entry 604 ("scan group count") in the data block directory 502. The procedure of locating a scan group using data block directory information is explained in further detail in the section "Locating Scan Groups," immediately below. Referring to FIG. 11, the magnetic tape 100 is accelerated (starting at the origin, 0, of the graph) to 100× velocity (100 times normal read velocity), which velocity is reached at 1110. The magnetic tape 100 is decelerated at 1115 to reach a normal (1×) read speed at 1120, which is the location on the magnetic tape 100 of the scan group 700 containing the requested data block 401. At step 960, the tape drive control unit 370 starts reading the magnetic tape 100 at normal (1×) speed, and continues reading until the buffer 802 is filled, at 1130. The control unit 370 then locates the requested data block 401 in the buffer 802.

Locating Scan Groups

The number of scan groups 700 between a present position of magnetic tape 100 under read/write heads 321,322 and the position of the requested data block 401 on magnetic tape 100 can be calculated by referring to the data block directory 502 in the internal leader header 105. Assume, for example, that the magnetic tape 100 is presently positioned to physical scan group number 512. Assume also that the target data block 401 to be located has a (logical) data block number of 3. A search is made of the internal leader header 105 data block directory 502 for the entry containing data block number 3. This entry in the data block directory 502 contains the scan group number of the unique physical scan group 700 in which the beginning of data block number 3 is located. Assume, also, that the scan group number (for block number 3) is 612. In this example, the tape position distance from the present tape position to the target data block 401 is equal to (scan group number) 612 minus (scan group number) 512, which is a distance of 100 scan groups. In the embodiment of the present invention described above, there are six helical tracks 204 per scan group 700, and one pulse doublet 407 per helical track 204. Since the distance to the target data block 401 has been calculated to be 100 scan groups, the number of pulse doublets 407 between the present tape position and the target data block tape location is thus determined to be:

6×100=600 pulse doublets.

Therefore, a 100× high speed search via the servo control track 202 would position the magnetic tape 100 to the scan group 700 containing the start of the target data block 401 after counting 600 pulse doublets 407.

Figure 12:
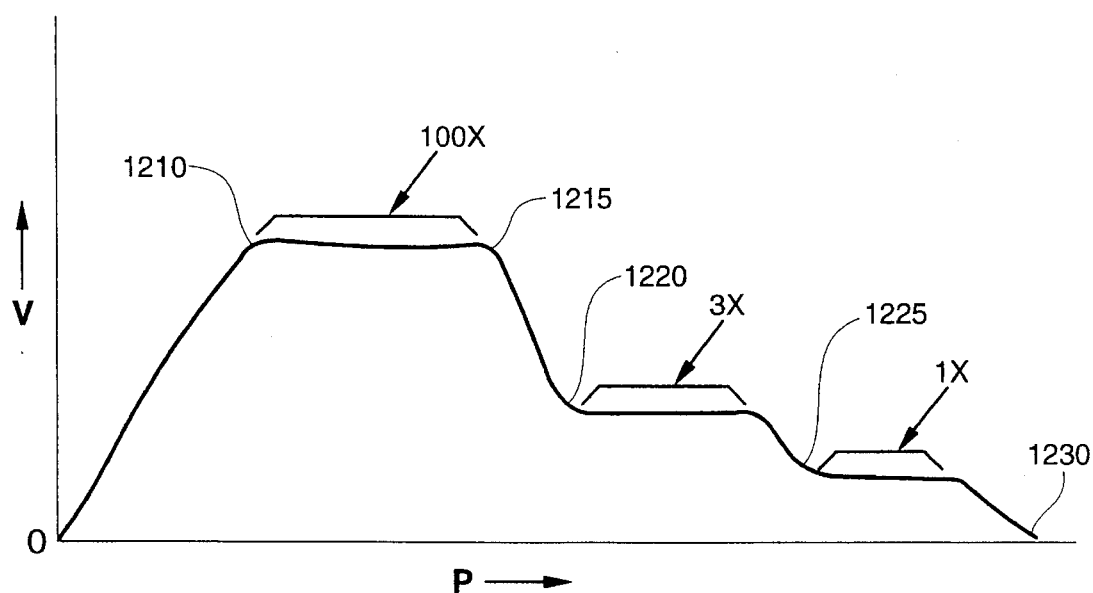
FIG. 12 is a velocity profile illustrating a "locate data block" operation wherein there is a command parameter/internal leader header mismatch.

Locate Logical Block—Data Mismatch Between Internal Leader Header 105 and Host Request FIG. 12 is a velocity profile illustrating a "locate data block" operation wherein the Locate Block command parameters do not match the corresponding information stored in the internal leader header 105. Referring also to FIG. 9, at step 910, the host computer 380 issues a "Locate Block" command to the tape drive control unit 370. The Locate Block command includes parameters specifying the requested data block number (block ID 405) and the sector number in which the data block 401 is expected to be found. At step 920, a check is made to determine whether the internal leader header 105 is both present and usable. If the internal leader header 105 is intact, then at step 930, the data block directory 502 in the internal leader header 105 is searched to find the entry containing the requested data block 401. If, at step 940, the entry in the data block directory 502 does not match the sector number 602 and block number 601 parameters in the Locate Block command, then at step 980, the subsector number 603 for the requested data block is located in the internal leader header 105 data block directory 502, using the directory entry for the requested data block 401. Also at step 980, and referring to FIG. 12, the magnetic tape 100 is accelerated (starting at the origin, 0, of the graph) to 100× velocity (100 times normal read velocity), which velocity is reached at 1210. At step 990, the magnetic tape 100 is decelerated at 1215 so as to reach a 3× velocity (3 times normal read velocity) at 1220, which is the location of the subsector 404 containing the requested data block 401. Data on the helical tracks 204 in the subsector 404 is then read at a 3× velocity until the requested data block 401 is located, at the horizontal rightmost part of the curve above and to the immediate left of 1225. Data block numbers (block IDs 405) can be searched for at three times normal read velocity because block number (block ID 405) information 722 is written in each sync block 711, which is written on every helical track 204. At step 960, (also FIG. 12 at 1225), the magnetic tape 100 is read at a normal 1× read velocity until the buffer 802 is filled. The requested data block 401 is then located in the buffer 802.

Locate Logical Block—No Usable Internal Leader Header

Figure 13:
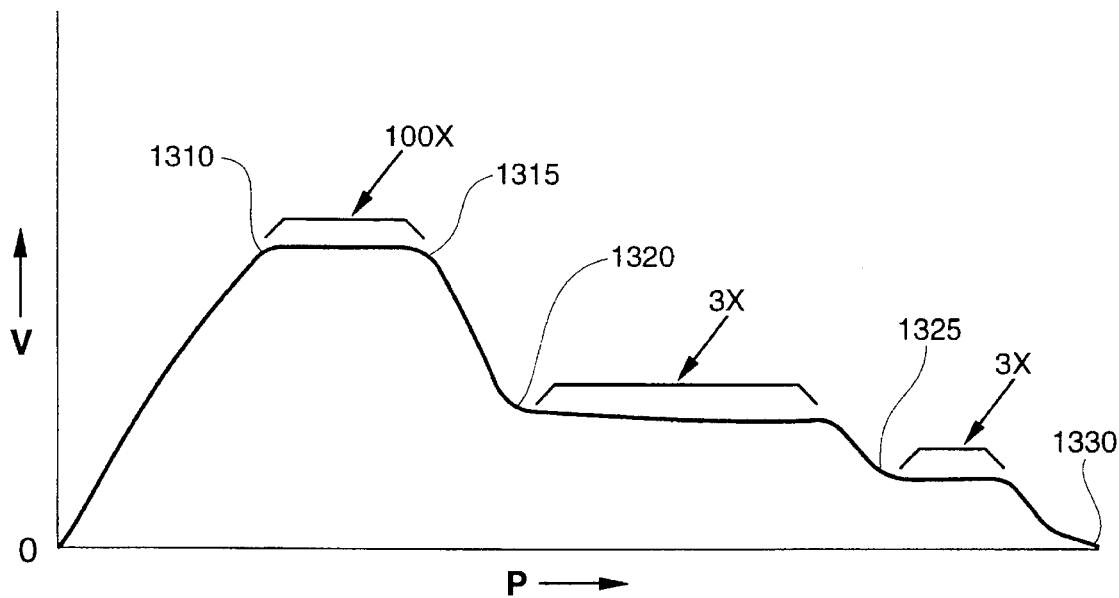
FIG. 13 is a velocity profile illustrating a "locate data block" operation wherein the ILH is either damaged or nonexistent.

FIG. 13 is a velocity profile illustrating a "locate data block" operation wherein the internal leader header 105 is either damaged or nonexistent. Referring also to FIG. 9, at step 910, the host computer 380 issues a "Locate Block"

command to the tape drive control unit 370. The Locate Block command includes parameters specifying the requested data block number (block ID 405) and the sector number in which the data block 401 is expected to be found. At step 920, a check is made to determine whether the internal leader header 105 is both present and usable. If the internal leader header 105 is determined to be not usable, then at step 970, a high speed search is made to the sector number just prior to the sector number specified in the Locate Block command (sector number −1). The requested sector number minus one is located via a 100× search using longitudinal servo control track 202 information. The magnetic tape 100 is then accelerated (starting at the origin, 0, of the graph) to 100× velocity (100 times normal read velocity), which velocity is reached at 1310. The magnetic tape 100 is decelerated at 1315 so as to reach a 3× velocity (3 times normal read velocity) at 1320, which is the location of the sector 400 containing the requested data block 401. At step 990, data on the helical tracks 204 in the sector 400 is then read at a 3× velocity until the requested data block 401 is located, at the horizontal rightmost part of the curve above and to the immediate left of 1325. At step 960 (and at 1325 on FIG. 13), the magnetic tape 100 is read at a normal 1× read velocity until the buffer 802 is filled, at 1330. The requested data block 401 is then located in the buffer 802.

Forward Space File

Figure 14:
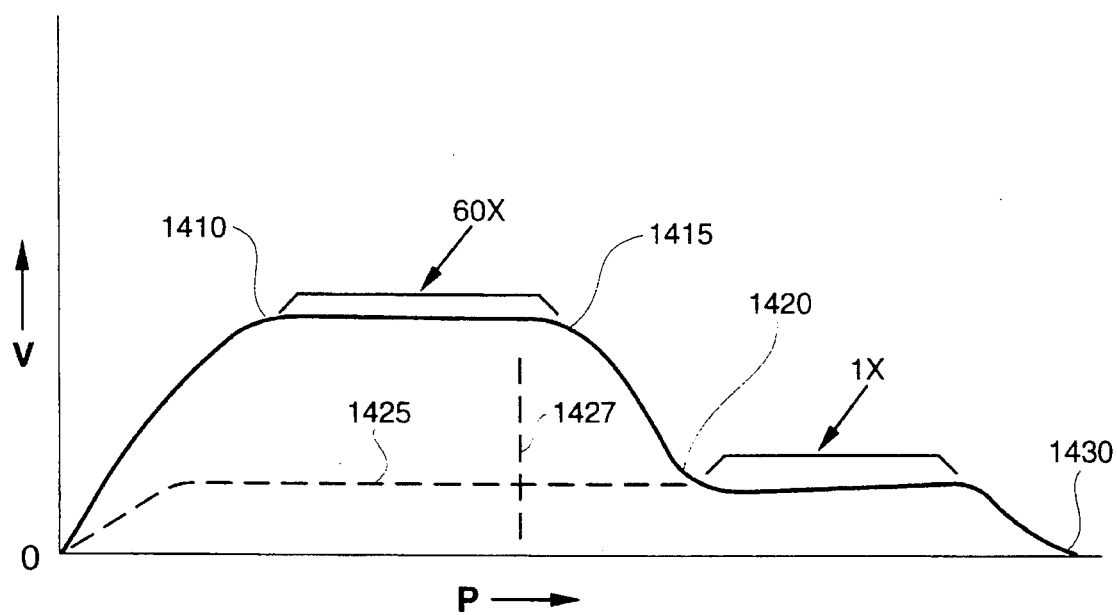
FIG. 14 is a velocity profile illustrating a "forward space file" operation.

FIG. 14 is a velocity profile illustrating a "forward space file" operation. The procedure for locating the beginning of the next sequential file mark 403 on the magnetic tape 100 assumes that the "starting" file number hereinafter referred to is the sequential number of the data file or a file mark 403 to which the magnetic tape 100 is presently positioned.

Referring also to FIG. 10, at step 1000, the host computer 380 issues a "Forward Space File" command to the tape drive control unit 370. At step 1010, a check is made to determine whether the internal leader header 105 is both present and usable. If the internal leader header 105 is intact, then at step 1015, the administrative information section 501 of the internal leader header 105 is searched for the location of the file mark scan group 403 representing the next sequential file mark 403 on the magnetic tape 100. If, at step 1020, a file mark scan group 403 is found in the internal leader header 105, then at step 1025, and also referring to FIG. 10, a "fast forward" positioning of the magnetic tape 100 is initiated, using the servo control track 202, (starting at the origin, 0, of the graph) at 60× velocity (60 times normal read velocity) to the file mark scan group 403 which is expected to be encountered at 1420. This 60× velocity is reached at 1410, and if no unexpected file marks 403 are encountered, deceleration of the magnetic tape 100 occurs at 1415, and the expected file mark scan group 403 is encountered at 1420. As the magnetic tape 100 is accelerated forward, the longitudinal time code track 201 is read, at step 1030, to see if an unexpected file mark 403, i.e., a file mark 403 not indicated in the internal leader header 105, is encountered. In any event, the 60× read of the longitudinal time code track 201 is continued, concurrent with the fast forward positioning, until a file mark 403 is encountered on longitudinal track 201. At 1420, the magnetic tape 100 is decelerated to a 1× normal read velocity. Assuming no unexpected file mark 403 was encountered on the longitudinal time code track 201, then at step 1035, the file mark scan group 403 header is read to determine the file mark number. At step 1040, (and at 1420 on FIG. 14), the file mark number found in the header is checked to see whether the file mark number contained therein is correct, i.e., equal to the starting file number plus one (1). If the file mark number found in the scan group header is correct, then, at step 1045, the magnetic tape 100 helical track data is read at a normal 1× read velocity until the buffer 802 is filled, at 1430. The requested data block 401 is then located in the buffer 802.

Forward Space File—Anomalous Internal Leader Header or File mark

Figure 15:
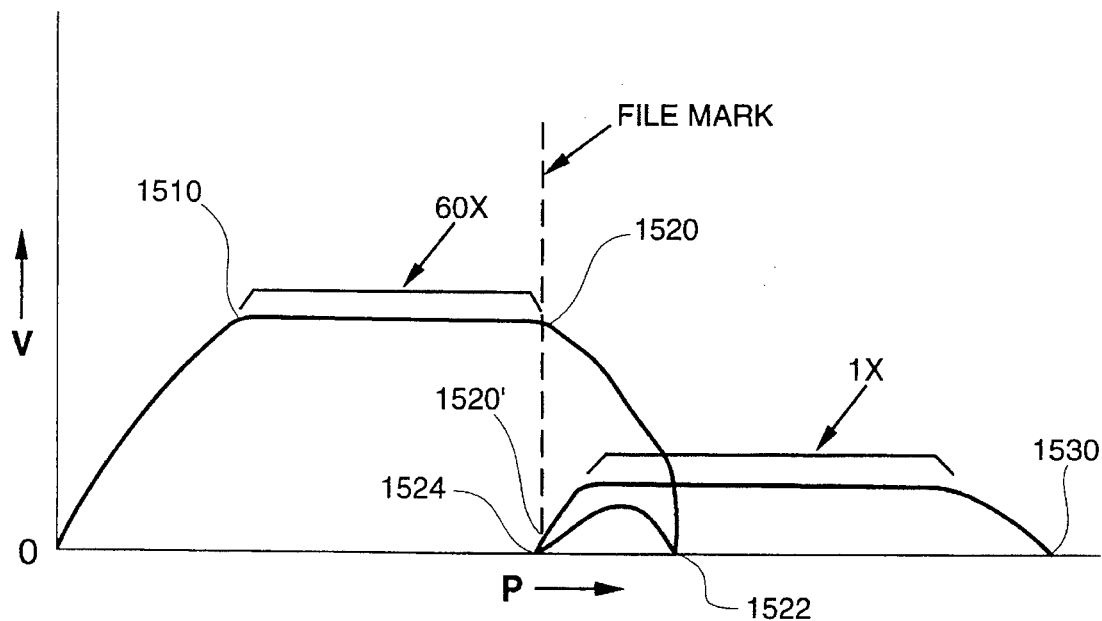
FIG. 15 is a velocity profile illustrating a "forward space file" operation, wherein an anomalous situation exists with respect to either the ILH or to a tape mark.

FIG. 15 is a velocity profile illustrating a "forward space file" operation, wherein either no internal leader header 105 exists, no indication of a file mark 403 exists in the internal leader header 105, an unexpected file mark 403 is encountered on a longitudinal track, or the file mark number is incorrect.

Referring also to FIG. 10, at step 1000, the host computer 380 issues a "forward space file" command to the tape drive control unit 370. At step 1010, a check is made to determine whether the internal leader header 105 is both present and usable. If the internal leader header 105 is determined to be either nonexistent or unusable, then at step 1055, a read operation is performed on the longitudinal time code track 201 of the magnetic tape 100 (starting at the origin, 0, of the graph) at 60× velocity, which is reached at 1510. When a file mark 403 is found on the time code track 201, at 1520, the magnetic tape 100 is decelerated to a stop at 1522. Because the file mark 403 was located on the time code track 201, the file mark scan group 403 header on the helical track(s) 204 was over-shot, and therefore the magnetic tape 100 must be repositioned to the beginning of the file mark 403, at step 1060 (as shown at 1524). At step 1065, a 1× (normal) velocity read operation is performed to locate the file mark scan group 403 on the magnetic tape 100 helical tracks 204. Referring to FIG. 15, this read operation starts at 1524, and continues to 1530, until the buffer 802 is filled, at step 1045.

If, at step 1020, a file mark 403 is not found in the internal leader header 105, then at step 1055, a read operation is performed on the longitudinal time code track 201 of the magnetic tape 100 (starting at the origin, 0, of the graph) at 60× velocity, which is reached at 1510. When a file mark 403 is found on the time code track 201, at 1520, the magnetic tape 100 is decelerated to a stop at 1522. At step 1065, a 1× (normal) velocity read operation is performed to locate the file mark scan group 403 on the magnetic tape 100 helical tracks 204. Referring to FIG. 15, this read operation starts at 1524, reading the file mark 403 at 1520', and continues to 1530, until the buffer 802 is filled, at step 1045.

If, at step 1030, an unexpected file mark 403 was encountered on the longitudinal time code track 201, the internal leader header 105 is presumed to be invalid, and since the file mark scan group 403 header on the helical track(s) 204 was over-shot, the magnetic tape 100 must be repositioned to the beginning of the file mark scan group 403, on helical tracks 204, at step 1060. Note that the tape velocity profile shown in FIG. 15 starting at the origin, 0, and continuing through reference numbers 1510, 1520, and 1522 to 1524 is applicable in this case. At step 1065, a 1× (normal) velocity read operation is performed to locate the file mark scan group 403 on the magnetic tape 100 helical tracks 204. Referring to FIG. 15, this read operation starts at 1524, reading the file mark 403 at 1520', and continues to 1530, until the buffer 802 is filled, at step 1045.

Referring again to FIG. 14 at 1420, if at step 1040, the file mark number is incorrect, then at step 1070, the file mark number just read is checked to determine if that file mark number is the same as the starting file number. If the file mark numbers are not the same, then at step 1075, the magnetic tape 100 is repositioned backward to the beginning of the starting file number scan group, shown at the graph origin, 0, in FIG. 14 (The repositioning is not shown on the graph). It should be noted that the actual repositioned location of the magnetic tape 100 could be a point further backward than that shown in FIG. 14. At step 1065, as shown by the dotted line 1425, a 1× (normal) velocity read operation is performed to locate the file mark scan group 403 on the magnetic tape 100 helical tracks at 1427. At step 1045, the magnetic tape 100 helical track data is read at a normal 1× read velocity until the buffer 802 is filled, at 1430. The requested data block 401 is then located in the buffer 802.

It is to be expressly understood that the claimed invention is not to be limited to the description of the preferred embodiment but encompasses other modifications and alterations within the scope and spirit of the inventive concept.

We claim:

1. In a data recording system using magnetic tape for storing data, said recording system connected to a host computer, said recording system using a recording format on said magnetic tape employing a plurality of helically scanned tracks for storing said data, including a first longitudinal track for storing magnetic tape position information indicative of location of said data and a second longitudinal track containing position marks and servo control pulses, said position information being written at equally spaced predetermined locations on a said first longitudinal track, said position information comprising a plurality of file marks and sector marks said data being logically segmented into files containing sectors comprising data blocks, and wherein said data recording system uses a tape drive control unit to store a memory copy of said header area from said magnetic tape, a method for locating a selected block in response to a command from said host computer, said command including indicia of location of said selected data block comprising the steps of:

placing a header area on said helically scanned tracks for locating said selected block, said header area containing indicia of location of said data blocks comprising the number of said servo control pulses between said header area and a location of each of said blocks;

reading said memory copy of said header area to determine whether valid magnetic tape position information is contained therein; and employing redundant strategies for locating said selected data block, one of said strategies being selected according to a data integrity of said header area, said strategies further comprising the steps of:

using, in response to a situation wherein said header area is useable by said recording system, said indicia of location in said header are to locate said selected data block by counting said servo control pulses on said second longitudinal track;

using, in response to the situation wherein said header area is unusable by said recording system, data stored on said servo control track to first locate said sector mark delineating the sector preceding the sector containing said selected data block by counting said servo control pulses on said second longitudinal track prior to location closed selected data block; and using, in response to a situation wherein said header area is useable by said recording system, and wherein said indicia of location of said data blocks is not consistent with said indicia of location in said command from said host computer, data stored on said second longitudinal track to first locate one of said position marks delineating the file containing said selected data block prior to locating said selected data block.

2. The method according to claim 1 wherein said data stored on said first longitudinal track include scan group frames.

3. The method according to claim 1 wherein said position marks are sub-sector marks.

4. The method according to claim 1 wherein locating said selected data block alternatively includes locating a scan group for said selected data block on said first longitudinal track.

\* \* \* \* \*